United States Patent

Winker et al.

[11] Patent Number: 5,986,733
[45] Date of Patent: Nov. 16, 1999

[54] NEGATIVE OPTICAL COMPENSATOR TILTED IN RESPECT TO LIQUID CRYSTAL CELL FOR LIQUID CRYSTAL DISPLAY

[75] Inventors: Bruce K. Winker, Moorpark; William J. Gunning, III, Newbury Park; Donald B. Taber, Thousand Oaks, all of Calif.

[73] Assignee: Rockwell International Corporation, Costa Mesa, Calif.

[21] Appl. No.: 08/056,265

[22] Filed: Apr. 30, 1993

[51] Int. Cl.[6] .................................................. G02F 1/1335
[52] U.S. Cl. ............................. 349/120; 349/84; 349/118
[58] Field of Search .............................. 359/73; 349/119, 349/121, 120, 84, 118, 117

[56] References Cited

U.S. PATENT DOCUMENTS

| | | | |
|---|---|---|---|
| 4,701,028 | 10/1987 | Clerc et al. | 350/337 |
| 4,889,412 | 12/1989 | Clerc et al. | 350/347 E |
| 5,124,824 | 6/1992 | Kozaki et al. | 359/73 |
| 5,194,975 | 3/1993 | Akatsuka et al. | 359/73 |
| 5,196,853 | 3/1993 | Yeh et al. | 359/73 |
| 5,291,323 | 3/1994 | Ohnishi et al. | 359/73 |

FOREIGN PATENT DOCUMENTS

| | | | |
|---|---|---|---|
| 0 239 433 | 9/1987 | European Pat. Off. | G02F 1/137 |
| 0 349 900 | 1/1990 | European Pat. Off. | G02F 1/1335 |
| 0 350 383 | 1/1990 | European Pat. Off. | G02F 1/133 |
| 0 372 973 | 6/1990 | European Pat. Off. | G02F 1/137 |
| 4115224 | 4/1992 | Japan | G02F 1/1335 |

*Primary Examiner*—Kenneth Parker
*Attorney, Agent, or Firm*—James P. O'Shaughnessey; John J. Deinken

[57] ABSTRACT

A normally white liquid crystal display includes polarizer and analyzer layers having perpendicular absorbing axes. A liquid crystal layer is disposed between the polarizer layer and the analyzer layer, with its director exhibiting an azimuthal twist through the layer. First and second electrodes are proximate to first and second major surfaces of the liquid crystal layer. A first negatively birefringent compensator layer, oriented with its optical axis substantially parallel to the average direction of the optical axis within a central, nominally homeotropic region of the liquid crystal layer in its driven state, is disposed between the polarizer layer and the liquid crystal layer. A second negatively birefringent compensator layer, with a birefringence substantially the same as the birefringence of the first compensator layer and oriented with its optical axis substantially parallel to the optical axis of the first compensator layer, is disposed between the analyzer layer and the liquid crystal layer.

8 Claims, 7 Drawing Sheets

NEGATIVE OPTICAL COMPENSATOR TILTED IN RESPECT TO LIQUID CRYSTAL CELL FOR LIQUID CRYSTAL DISPLAY

BACKGROUND OF THE INVENTION

This invention is concerned with the design of liquid crystal displays and particularly with techniques for maximizing the field of view of such displays by maintaining a high contrast ratio at wide viewing angles.

Liquid crystals are useful for electronic displays because polarized light traveling through a thin film of liquid crystal is affected by the birefringence of the film and the birefringence can be controlled by the application of a voltage across the film. Liquid crystal displays became desirable because the transmission or reflection of light from an external source, including ambient light, could be controlled using a liquid crystal device with much less power than was required for the luminescent materials used in other displays. As a result, liquid crystal displays are now commonly used in such applications as digital watches, calculators, portable computers, and many other types of electronic equipment, exhibiting in these applications the advantages of very long life and operation with very low weight and low power consumption.

The information in many liquid crystal displays is presented in the form of a row of numerals or characters, which are generated by a number of segmented electrodes arranged in a pattern. The segments are connected by individual leads to driving electronics, which applies a voltage to the appropriate combination of segments to display the desired information by controlling the light transmitted through the segments. Graphic information or television displays may be achieved by a matrix of pixels which are connected by an X-Y sequential addressing scheme between two sets of perpendicular conductors. More advanced addressing schemes use arrays of thin film transistors to control the drive voltage at the individual pixels. The latter scheme is applied predominantly to twisted nematic liquid crystal displays.

Contrast is one of the most important attributes determining the quality of a liquid crystal display. The primary factor limiting the contrast achievable in a liquid crystal display is the amount of light which leaks through the display in the dark state. This problem is exacerbated in a high ambient light environment, such as direct sunlight, where there is a considerable amount of reflected and scattered ambient light. In addition, the contrast ratio of the liquid crystal device also depends on the viewing angle. Contrast ratio in a typical liquid crystal display is a maximum only within a narrow viewing angle centered about normal incidence and drops off as the angle of view is increased. This loss of contrast ratio is caused by light leaking through the black state pixel elements at large viewing angles. In color liquid crystal displays, such leakage also causes severe color shifts for both saturated and gray scale colors. These limitations are particularly important for applications requiring a very high quality display, such as avionics, where viewing of avionics displays from both pilot and copilot seating positions is important. It would be a significant improvement in the art to provide a liquid crystal display capable of presenting a high quality, high contrast image over a wide field of view.

Yeh, et al., "Compensator for Liquid Crystal Display . . . ", U.S. Pat. No. 5,196,953, discloses a novel structure for a compensator in such a liquid crystal display, making possible a considerable improvement in the viewing contrast and color rendition of such displays at oblique viewing angles. Further improvements in contrast and viewing angle, however, are desirable for such displays.

SUMMARY OF THE INVENTION

A normally white liquid crystal display includes a polarizer layer having an absorbing axis and an analyzer layer having an absorbing axis substantially perpendicular to the absorbing axis of the polarizer layer. A liquid crystal layer is disposed between the polarizer layer and the analyzer layer, with a director exhibiting an azimuthal twist through the layer. A first electrode is proximate to a first major surface of the liquid crystal layer and a second electrode is proximate to a second major surface of the liquid crystal layer, the first and second electrodes being adapted to apply a voltage across the liquid crystal layer when the electrodes are connected to a source of electrical potential. A first negatively birefringent compensator layer, oriented with its optical axis substantially parallel to the average direction of the optical axis within a central, nominally homeotropic region of the liquid crystal layer in its driven state, is disposed between the polarizer layer and the analyzer layer. A second negatively birefringent compensator layer may also be included, in which case the first compensator layer is placed between the polarizer layer and the liquid crystal layer. The second compensator layer exhibits a birefringence substantially the same as the birefringence of the first compensator layer and is oriented with its optical axis substantially parallel to the optical axis of the first compensator layer, is disposed between the analyzer layer and the liquid crystal layer.

In a more particular embodiment, the first and second compensator layers are substantially parallel to the polarizer and analyzer layers and the liquid crystal layer is tilted with respect to the first and second compensator layers such that the optical axis of the first compensator layer is substantially parallel to the average direction of the optical axis within the central, nominally homeotropic region of the liquid crystal layer in its driven state. An additional embodiment includes first and second compensator layers which are tilted with respect to the polarizer, analyzer, and liquid crystal layers such that the optical axis of the first compensator layer is substantially parallel to the average direction of the optical axis within the central, nominally homeotropic region of the liquid crystal layer in its driven state. Another possible embodiment includes polarizer and analyzer layers whose absorbing axes are oriented substantially perpendicular to the extraordinary axis of the first compensator layer.

DESCRIPTION OF THE INVENTION

Figure 1:
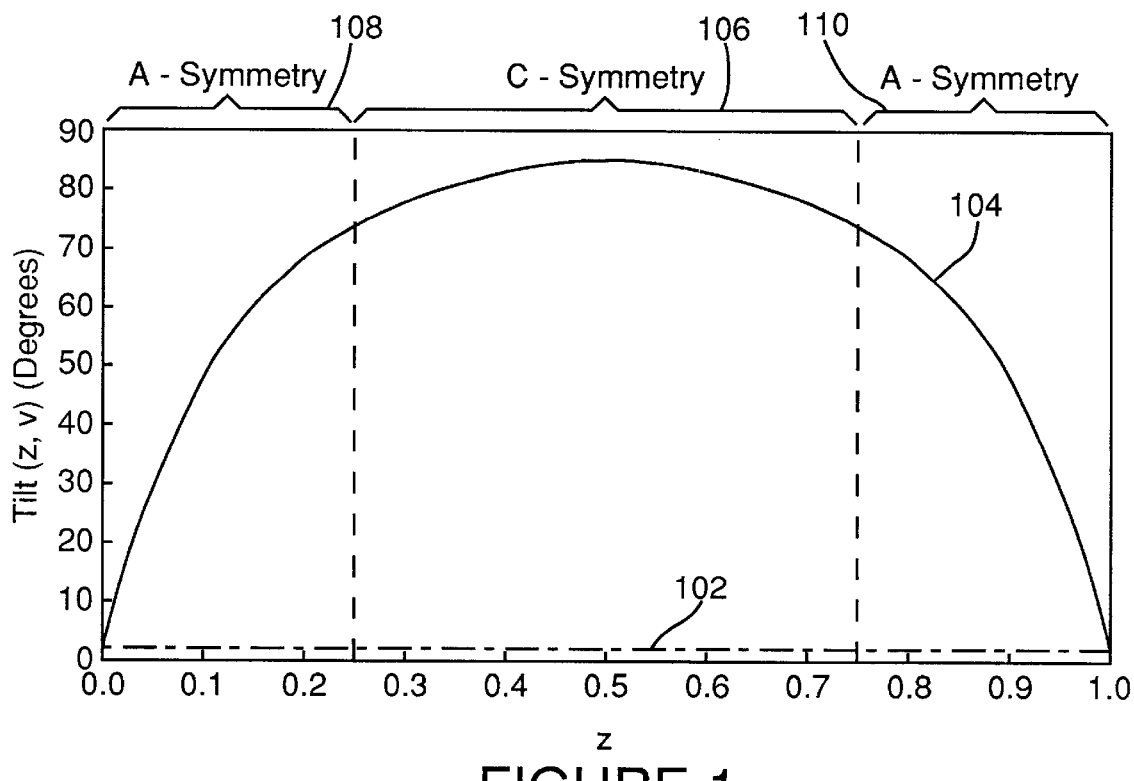
FIG. 1 is a plot of tilt angle (in degrees along the vertical axis) as a function of position (as a fraction z of depth along the horizontal axis) in a twisted nematic liquid crystal cell.

As explained in Yeh, et al., "Compensator for Liquid Crystal Display . . . ", U.S. Pat. No. 5,196,953 (the teaching of which is incorporated into this application by reference), when viewed directly a liquid crystal display provides high quality output, but the image tends to degrade and exhibit poor contrast at large viewing angles. This occurs because the phase retardation effect such a material has on light passing through it inherently varies with the inclination angle of the light, leading to a lower quality image at large viewing angles. By introducing an optical compensating element in conjunction with the liquid crystal cell, however, it is possible to correct for the unwanted angular effects and thereby maintain higher contrast at larger viewing angles than otherwise possible.

The type of optical compensation required depends upon the type of display, normally black or normally white, which is used. In a normally black display, a twisted nematic liquid crystal cell is placed between polarizers whose transmission axes are parallel to one another and to the orientation of the director of the liquid crystal at the rear of the cell (i.e., the side of the cell away from the viewer). In the unenergized state (no applied voltage), normally incident light from the backlight of the display is polarized by the first polarizer and in passing through the cell has its polarization direction rotated by the twist angle of the cell. This is caused by adiabatic following, which is also known as the waveguiding effect. The twist angle is set to 90° so that the light is blocked by the output polarizer. When a voltage is applied across a portion of the cell, the liquid crystal molecules are forced to more nearly align with the electric field, eliminating the twisted nematic symmetry. In this orientation, the average director of the cell is nearly perpendicular to the cell walls. The liquid crystal layer then appears isotropic to normally incident light, eliminating the waveguiding effect so that the polarization state is unchanged by propagation through the liquid crystal layer and such light can pass through the output polarizer. Patterns can be written in the display by selectively applying a voltage to the portions of the display which are to appear illuminated.

When viewed at large angles, however, the dark (unenergized) areas of a normally black display will appear light because of angle—dependent retardation effects for light passing through the liquid crystal layer at such angles, i.e., off—normal incidence light senses an angle— dependent change of refractive index. Contrast can be restored by using a compensating element which has an optical symmetry similar to that of the twist cell but which reverses its effect. One compensation method is to add a twist cell of reverse helicity to the display structure following the active liquid crystal layer. Another teaches the use of one or more A-plate retarder compensators (an A-plate is a uniaxial birefringent plate with its extraordinary axis (i.e., its c-axis) parallel to the surface of the plate). These compensation methods work because each compensation element shares an optical symmetry with the twisted nematic cell; i.e., both are uniaxial birefringent materials having an extraordinary axis orthogonal to the normal light propagation direction. These approaches to compensation have been widely utilized because of the ready availability of materials with the required optical symmetry. Reverse twist cells employ liquid crystal reverse twist layers and A-plate retarders are readily manufactured by the stretching of polymers such as polyvinyl alcohol (PVA).

Clerc, U.S. Pat. No. 4,701,028, for example, describes a compensation method or improving the viewing angle of vertically aligned nematic, or electrically controlled irefringence liquid crystal displays. It is limited to normally black displays in which the liquid crystal molecules are substantially oriented in the homeotropic direction (perpendicular to the cell surface) in the absence of an electric field, and in which the alignment is uniform from one cell surface to the other. The compensator consists of one or more negative birefringence uniaxial or biaxial plates in which the dominant symmetry axis is parallel to the liquid crystal molecules. The black state symmetry being compensated is completely uniform, because it results from the surface treatment only, not from the application of an electric field, and because there is no twist. The compensator may be located on either side or both sides of the liquid crystal layer, and may be fabricated from a polymer or thermoplastic polymer material. Clerc generally allows for the liquid crystal molecules, and therefore the compensator extraordinary axis, to be "substantially" homeotropic, which means that the exact angle is very close to perpendicular to the cell surface. Clerc does not mention any specific oblique orientation of either the liquid crystal molecules or the compensator.

Despite the effectiveness of these compensation techniques, there are drawbacks to this approach associated with the normally black operational mode. The appearance of a normally black display, for example, is very sensitive to cell gap. Consequently, in order to maintain a uniform dark appearance it is necessary to make a normally black liquid crystal cell very thick, which results in unacceptably long liquid crystal response times, to operate such a cell at a Gooch-Tarry minimum (See Gooch, et al., The Optical Properties of Twisted Nematic Liquid Crystal Structures with Twist Angles≦90°, Journal of Physics D, Volume 8, Page 1575 (1975)). This approach, however, imposes manufacturing tolerances on the liquid crystal cell gap which are difficult to achieve. Moreover, the cell gap must be different for each pixel color in a polychromatic display. In addition, the reverse twist compensation technique requires the insertion of a second liquid crystal cell into the optical train, adding significant cost, weight, and bulk to the display. Consequently, it is highly desirable to compensate a normally white display in order to avoid these disadvantages.

In the normally white display configuration, the 90° twisted nematic cell is placed between polarizers which are crossed, such that the transmission axis of each polarizer is either parallel or perpendicular to the director orientation of the liquid crystal molecules in the region of the cell adjacent to that polarizer. This reverses the sense of light and dark from that of the normally black display. The unenergized (no applied voltage) areas appear light in a normally white display, while those which are energized appear dark. The problem of ostensibly dark areas appearing light when viewed at large angles still occurs, but the reason for this problem is different than in the normally black configuration, and its correction requires another type of optical compensating element. In the energized areas the liquid crystal molecules tend to tilt and rotate toward alignment with the applied electric field. If this alignment were perfect, all the liquid crystal molecules in the cell would be oriented with their long axes normal to the substrate glass. This arrangement, known as the homeotropic configuration, would exhibit the optical symmetry of a positively birefringent C-plate (a C-plate is a uniaxial birefringent plate with its extraordinary axis (i.e., its c-axis) perpendicular to the surface of the plate). In the energized state the normally white display would thus appear isotropic to normally incident light, which would be blocked by the crossed polarizers.

One reason the loss of contrast with increased viewing angle occurs in a normally white display is because a homeotropic liquid crystal layer will not appear isotropic to off-normal light. Light propagating through the layer at off-normal angles appears in two modes due to the birefringence of the layer; a phase delay is introduced between those modes, increasing with the incident angle of the light. This phase dependence on incidence angle introduces an ellipticity to the polarization state which is incompletely extinguished by the second polarizer, giving rise to light leakage. Because of the C-plate symmetry of the liquid crystal layer, the birefringence (to a first approximation) has no azimuthal dependence. Needed to correct for this effect is an optical compensating element, also having C-plate symmetry, but with negative ($n_e < n_o$) birefringence. Such a compensator will introduce a phase delay opposite in sign to that caused by the liquid crystal layer, thereby restoring the original polarization state and allowing light passing through energized areas of the layer to be blocked more completely by the output polarizer. In order for such a compensator to be effective, the phase retardation of the compensating element must have the same magnitude as the phase retardation of the liquid crystal and must also change its value as a function of the viewing angle at the same rate as the change in the liquid crystal's phase retardation.

The situation is further complicated because perfect homeotropic alignment of the liquid crystal molecules in a display cell is not achieved with the voltage levels which can be practically applied across the cell. In a liquid crystal device the electric field is applied in a direction perpendicular to the surface of the cell. In a perfectly homeotropic cell, such an applied field would cause all the liquid crystal molecules to be aligned with the field perpendicular to the surface. The attachment of the liquid crystal layer to the substrate surface, however, prevents those liquid crystal molecules which are adjacent to the surface from tilting sufficiently to align completely parallel with the applied field. The molecules positioned away from the substrates will align more in parallel with the applied field, but elastic forces prevent alignment of the molecules exactly parallel to the applied field.

FIG. 1 is a calculated plot of tilt angle (in degrees along the vertical axis) as a function of position (as a fraction z of depth along the horizontal axis) in a 90° twisted nematic liquid crystal cell, illustrating a typical distribution of molecular tilt angles throughout the liquid crystal layer when no voltage is applied (represented by the lower dashed horizontal line 102) and under a typical applied voltage of approximately 4.8 V (depicted by the curve 104). The tilt angle is defined as the angle between the long molecular axis (the director) of a liquid crystal molecules and the plane of the substrate glass.

Figure 2:
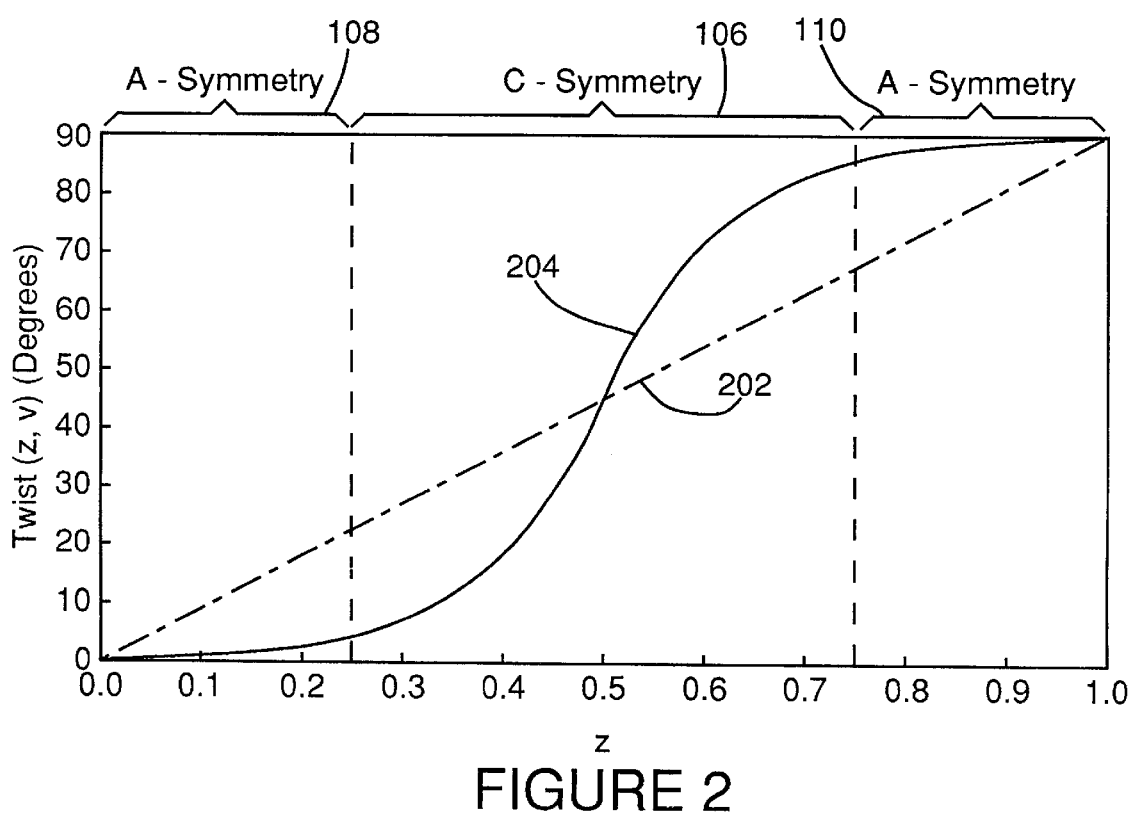
FIG. 2 is a related plot for the same cell depicting the twist angle of the liquid crystal molecules as a function of position in the cell.

FIG. 2 is a related plot for the same cell depicting the calculated twist angle of the liquid crystal molecules as a function of position in the cell. When there is no applied voltage, the twist of the cells is distributed evenly throughout the cell, as shown by the dashed line 202. Under a typical applied voltage (4.8 V), the twist angles are distributed as shown by the curve 204. As illustrated by FIGS. 1 and 2, under applied voltage conditions nearly all of the twist experienced by the liquid crystal molecules, and a substantial portion of the tilt exhibited by the molecules, occurs in the central region 106 of the cell. Because of these phenomena, the continuous variation of molecular orientation within the cell can be separated into three regions, each of which is characterized by its own optical symmetry. Thus the region 106 can be considered as nominally homeotropic, approximating the properties of a C-plate. The regions 108 and 110, near each surface of the cell, behave as A-plates, each with its extraordinary axis aligned with the rub direction of the proximate substrate. Because there is essentially no twist in the molecules of the regions 108 and 110, these molecules are essentially aligned with the respective rub directions on either side of the liquid crystal layer. In addition, because the twist angle of the molecules in the region 108 tends to be perpendicular to the twist angle of the molecules in the region 110, the effect of these two regions on light traveling through the cell tends to be canceled, leaving the middle C-plate region to exert the dominant influence.

Figure 3:
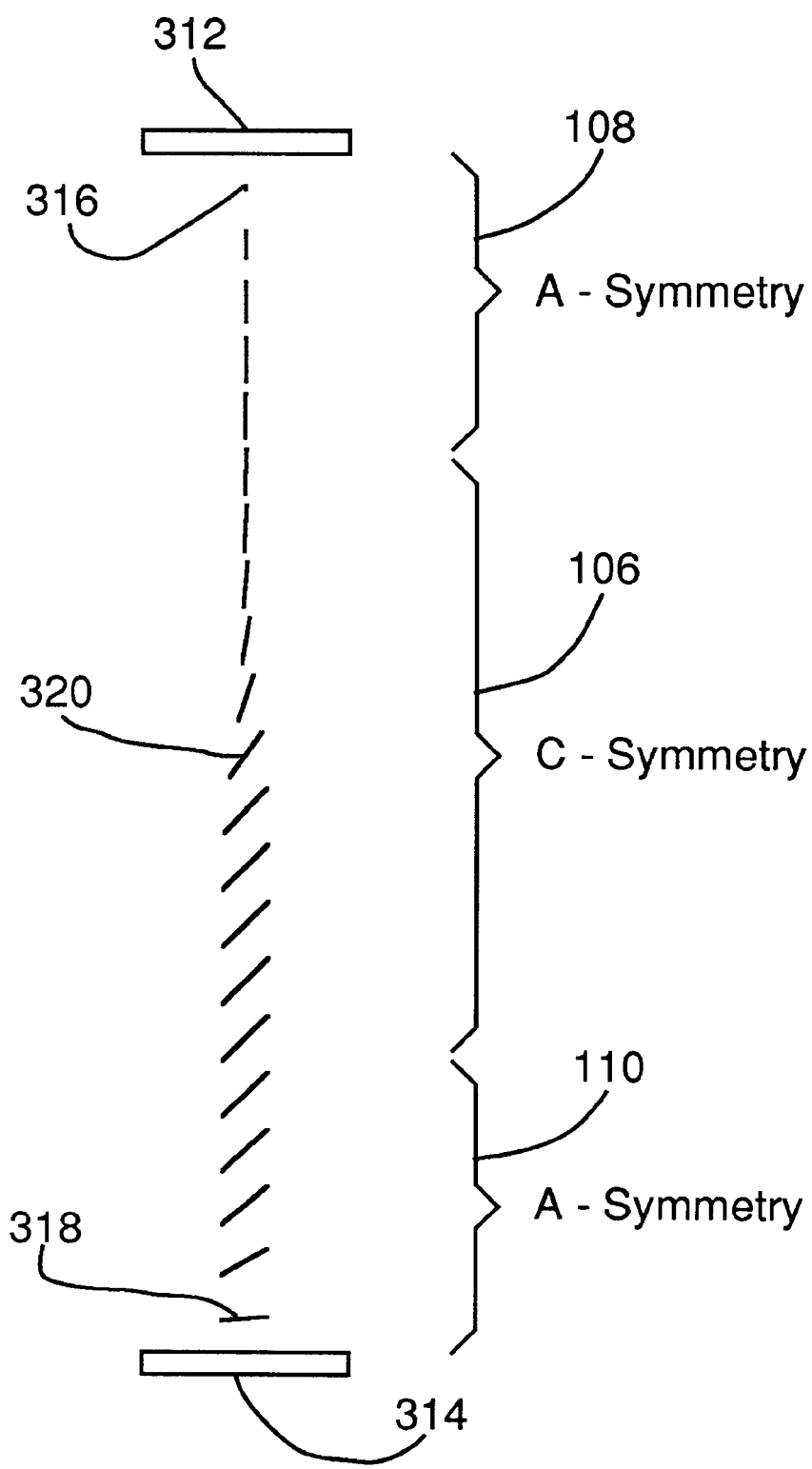
FIG. 3 is a cross-sectional schematic illustration showing the combined tilt and twist effect of an applied high field on the molecules in a liquid crystal layer.

FIG. 3 is a cross-sectional schematic illustration showing the combined tilt and twist effect of an applied high field on the molecules in a liquid crystal layer. The three dimensional orientations of the molecules are represented in two dimensions by the length and tilt of the lines between the electrodes 312 and 314. The point 316, for example, represents a molecule, near the upper surface of the cell, with almost no tilt and with a twist orientation substantially perpendicular to the plane of the drawing, while the line 318 represents a molecule, near the lower surface, also with substantially no tilt but with a twist orientation parallel to the plane of the drawing. A molecule in the center of the cell, represented by the line 320, will have a twist half way between that shown by the lines 316 and 318, i.e., 45°, and a nonzero tilt as well.

A negative C-plate compensator is designed to correct for the angle dependent phase shift introduced by propagation through the central, approximately C-plate region. Such a compensator is effective to the extent that the optical symmetry of this region dominates the selected state of the liquid crystal cell, that is, the extent to which the molecules align with the applied field. This implies that negative C-plate compensation will work best when strong fields are used for the energized state as this makes the homeotropic approximation more nearly correct.

Additional constraints are introduced when designing a color display. Uncompensated full color liquid crystal displays typically exhibit a large variation in chromaticity over the field of view. Consequently, an area which appears one color when viewed at normal incidence may appear less saturated or may even appear as its complementary color when viewed at large angles. There are two causes for such a variation in chromaticity: the change in the brightness versus voltage electrooptic response curve with angle, which causes shifts in gray level luminance, and leakage from pixels that are selected to be in the nontransmissive state. While compensation for contrast does not directly affect the brightness voltage characteristics, by reducing leakage in the dark state some improvement in chromaticity stability is achieved for saturated colors.

A full color display is achieved by placing red, blue, and green transmissive filters on a display's pixels. In the normally white type of color display, a red area is presented by selecting (applying voltage to) the blue and green pixels in that area to make them nontransmissive, while leaving the red pixels nonselected. This scheme functions adequately when viewed directly, but at large angles the blue and green pixels begin to transmit, thereby causing the red to appear washed out. This effect is suppressed in the normally white display by a C-plate compensator. Desaturation is eliminated by suppressing dark state leakage.

For the most effective compensation over all viewing angles the combined phase retardation of the compensator layers should equal the retardation of the liquid crystal layer. Those skilled in the art will appreciate, however, that the equivalent length of the central, nominally homeotropic region of the liquid crystal (i.e., the portion labeled C-symmetry in FIG. 3) must be determined empirically. Consequently, the optimum retardation of the compensator layers is best determined by experimentation for a given liquid crystal cell design and viewing angle requirement.

Figure 4:
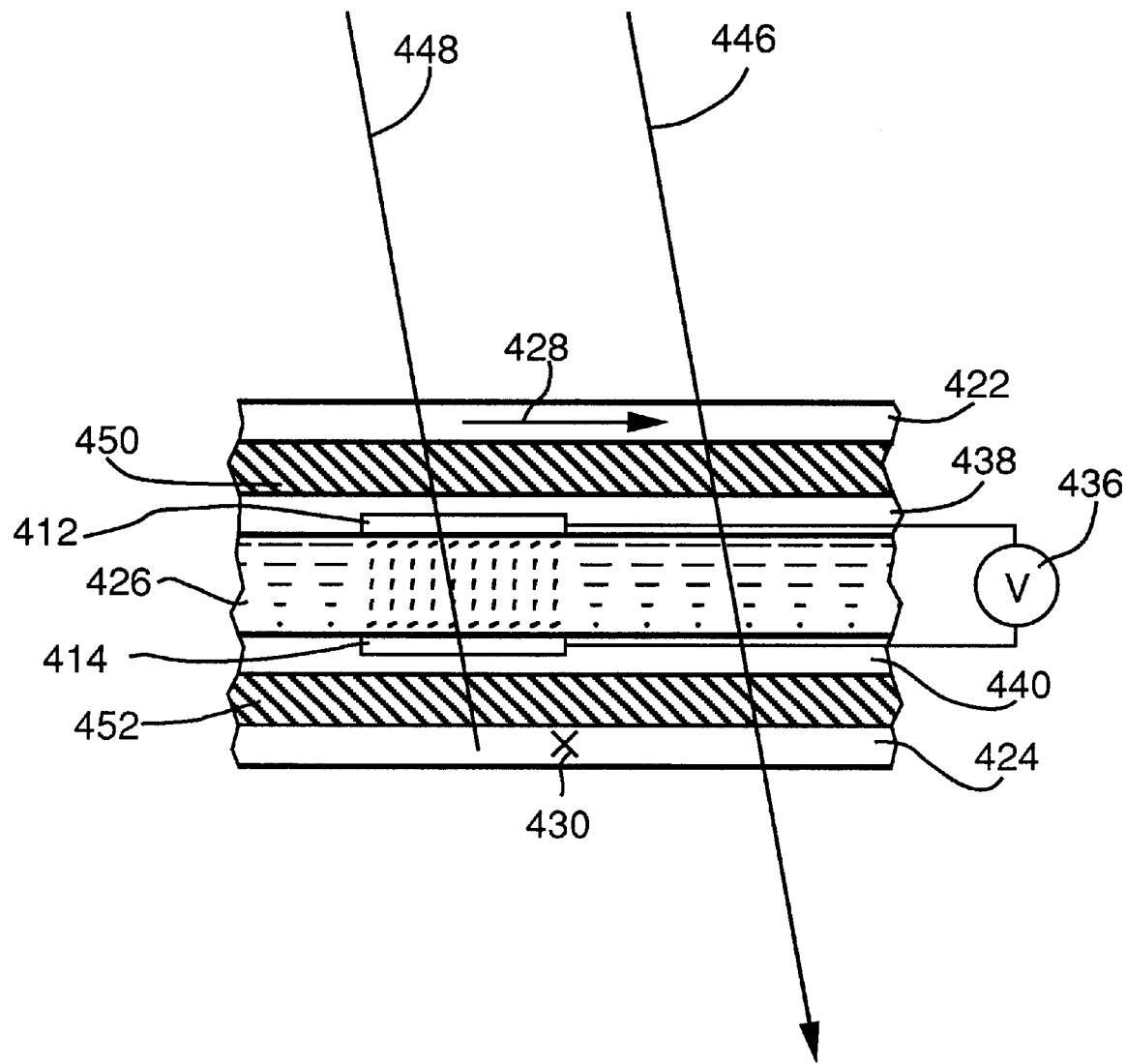
FIG. 4 is a cross sectional schematic side view of a twisted nematic, transmissive type normally white liquid crystal display (LCD) constructed according to this invention.

FIG. 4 is a cross sectional schematic side view of a twisted nematic, transmissive type normally white liquid crystal display (LCD) constructed according to this invention. The display includes a polarizer layer 422 and an analyzer layer 424, between which is positioned a liquid crystal layer 426, consisting of a liquid crystal material in the nematic phase. The polarizer and the analyzer, as is indicated by the symbols 428 (representing a polarization direction in the plane of the drawing) and 430 (representing a polarization direction orthogonal to the plane of the drawing), are oriented with their polarization directions at 90° to one another, as is the case for a normally white display. A first transparent electrode 412 and a second transparent electrode 414 are positioned adjacent to opposite surfaces of the liquid crystal layer so that a voltage can be applied, by means of a voltage source 436, across the liquid crystal layer. The liquid crystal layer is in addition sandwiched between a pair of glass plates 438 and 440. As is explained further below, the inner surfaces of the glass plates 438 and 440, which are proximate to the liquid crystal layer 426, are physically or chemically treated, as by buffing.

As is well known in the LCD art (see, e.g., Kahn, The Molecular Physics of Liquid-Crystal Devices, Physics Today, Page 68 (May 1982)), when the material of the liquid crystal layer 426 is in the nematic phase and the inner surfaces of the plates 438 and 440 (the surfaces adjacent to the layer 426) are coated with a polyimide, buffed, and oriented with their buffed directions perpendicular, the director n of the liquid crystal material, absent any applied electrical voltage, will tend to align with the buffed direction (known as the "rub direction") in the regions of the layer proximate each of the plates 438 and 440. Furthermore, the director will twist smoothly through an angle of 90° along a path in the layer 426 from the first major surface adjacent to the plate 438 to the second major surface adjacent to the plate 440. Consequently, in the absence of an applied electric field the direction of polarization of incoming polarized light will be rotated by 90° in traveling through the liquid crystal layer. When the glass plates and the liquid crystal layer are placed between crossed polarizers, such as the polarizer 428 and the analyzer 430, light polarized by the polarizer 428 and traversing the display, as exemplified by the light ray 446, will thus be aligned with the polarization direction of the analyzer 430 and therefore will pass through the analyzer. When a sufficient voltage is applied to the electrodes 412 and 414, however, the applied electric field causes the director of the liquid crystal material to tend to align parallel to the field. With the liquid crystal material in this state, light passed by the polarizer 428, as illustrated by the light ray 448, will be extinguished by the analyzer 430. Thus an energized pair of electrodes will produce a dark region of the display, while light passing through regions of the display which are not subject to an applied field will produce illuminated regions. As is well known in the LCD display art, an appropriate pattern of electrodes, activated in selected combinations, can be utilized in this manner to display alphanumeric or graphic information.

Compensating the birefringence with a negative birefringent C-plate does not completely cancel the residual display birefringence because the average director of the liquid crystal is not exactly at 90° but rather is oriented obliquely at about 80°. The pair of compensator layers 450 and 452 enhance the viewing properties of the display over a wide range of viewing angles. The first compensator layer 450 is a negatively birefringent compensator layer which is oriented with its optical axis substantially parallel to the average direction of the optical axis within the central, nominally homeotropic region of the liquid crystal layer in its driven state. This layer 450 is placed between the polarizer layer 428 and the liquid crystal layer 426. The second compensator layer 452 is a negatively birefringent layer with a birefringence substantially the same as the birefringence of the first compensator layer. The second layer 452 is oriented with its optical axis substantially parallel to the optical axis of the first compensator layer and is placed between the analyzer layer 430 and the liquid crystal layer 426.

Figure 5:
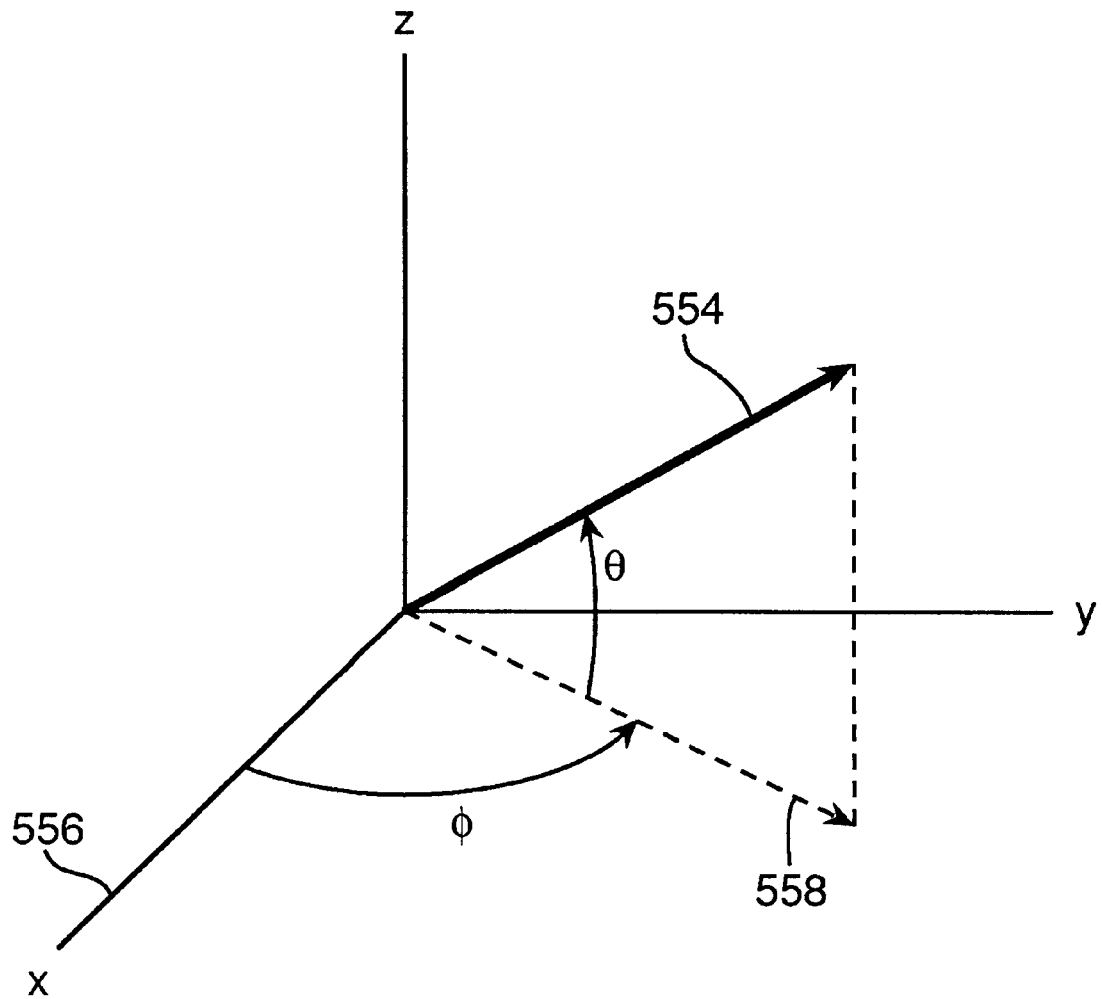
FIG. 5 is a diagram illustrating the convention used for specifying the direction of the optical axis (or absorbing axis, in the case of the polarizer and analyzer) in FIGS. 6–8.
Figure 6:
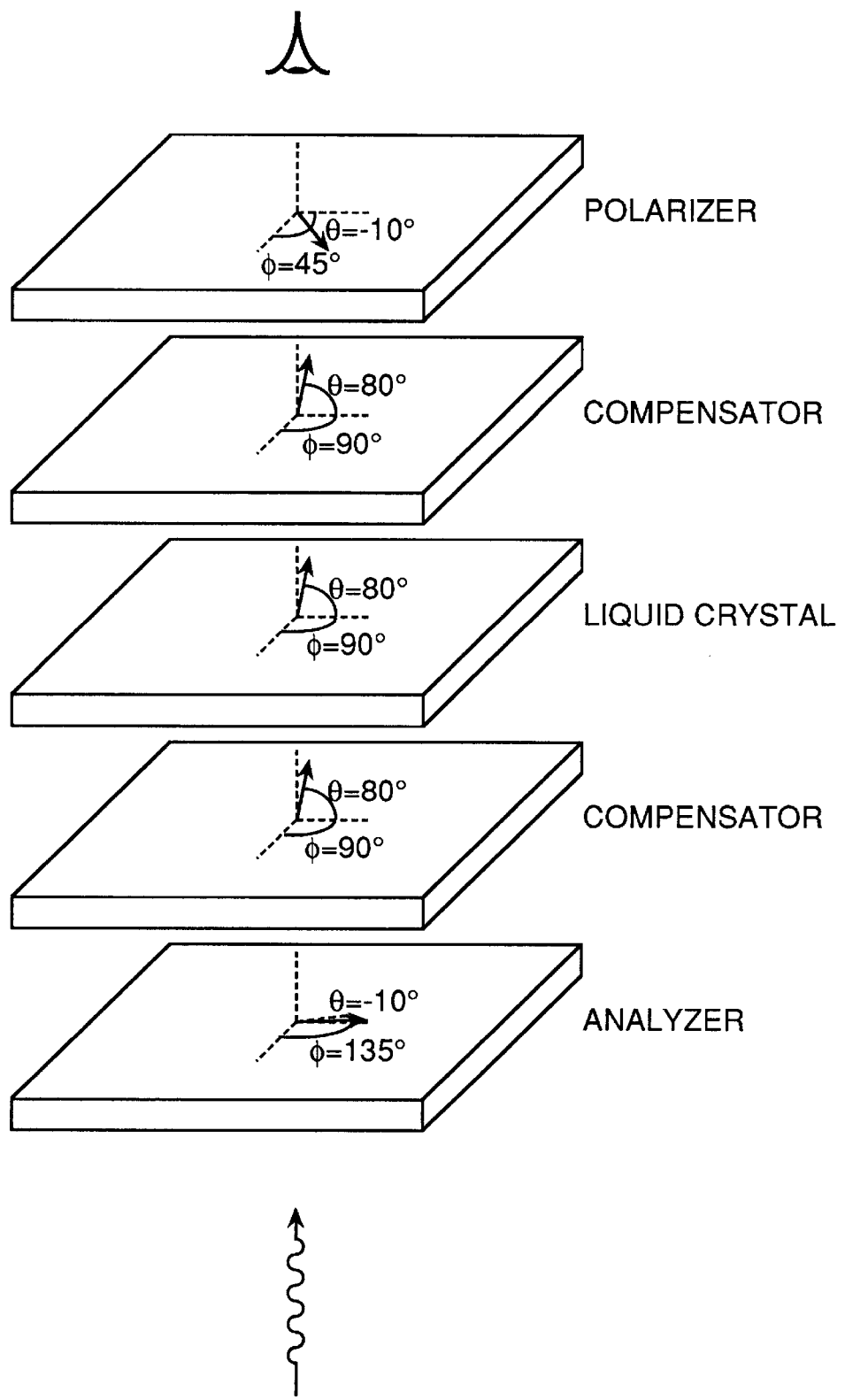
FIGS. 6–8 are schematic, expanded views illustrating the relationship between the elements in particular embodiments of a liquid crystal display constructed according to the present invention.
Figure 7:
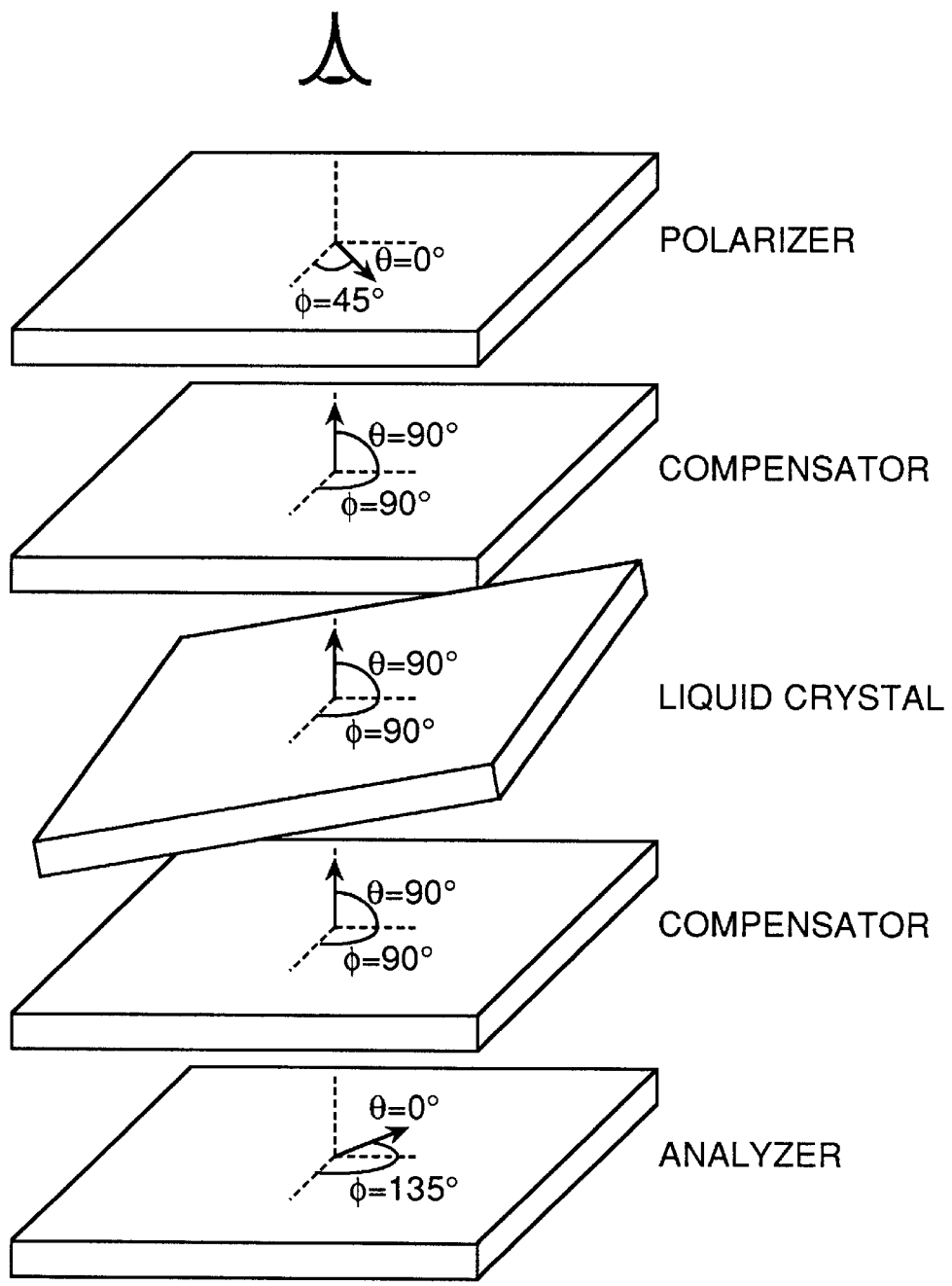

The liquid crystal layer, the compensator layers, and the polarizer and analyzer layers may assume a variety of orientations relative to one another in order to ensure that the optical axes of the compensator layers are substantially parallel to the average direction of the optical axis within the central, nominally homeotropic region of the liquid crystal layer. FIGS. 5–8 are provided to illustrate some of the possible orientations. FIG. 5 is a diagram illustrating the convention used for specifying the direction of the optical axis (or absorbing axis, in the case of the polarizer and analyzer) in the various components of a liquid crystal display constructed according to the invention. The twist of the optical axis 554 is indicated by the angle φ between the x axis 556 and the projection 558 of the optical axis onto the xy plane. The tilt of the optical axis is indicated by the angle θ between the xy plane and the optical axis.

Figure 8:
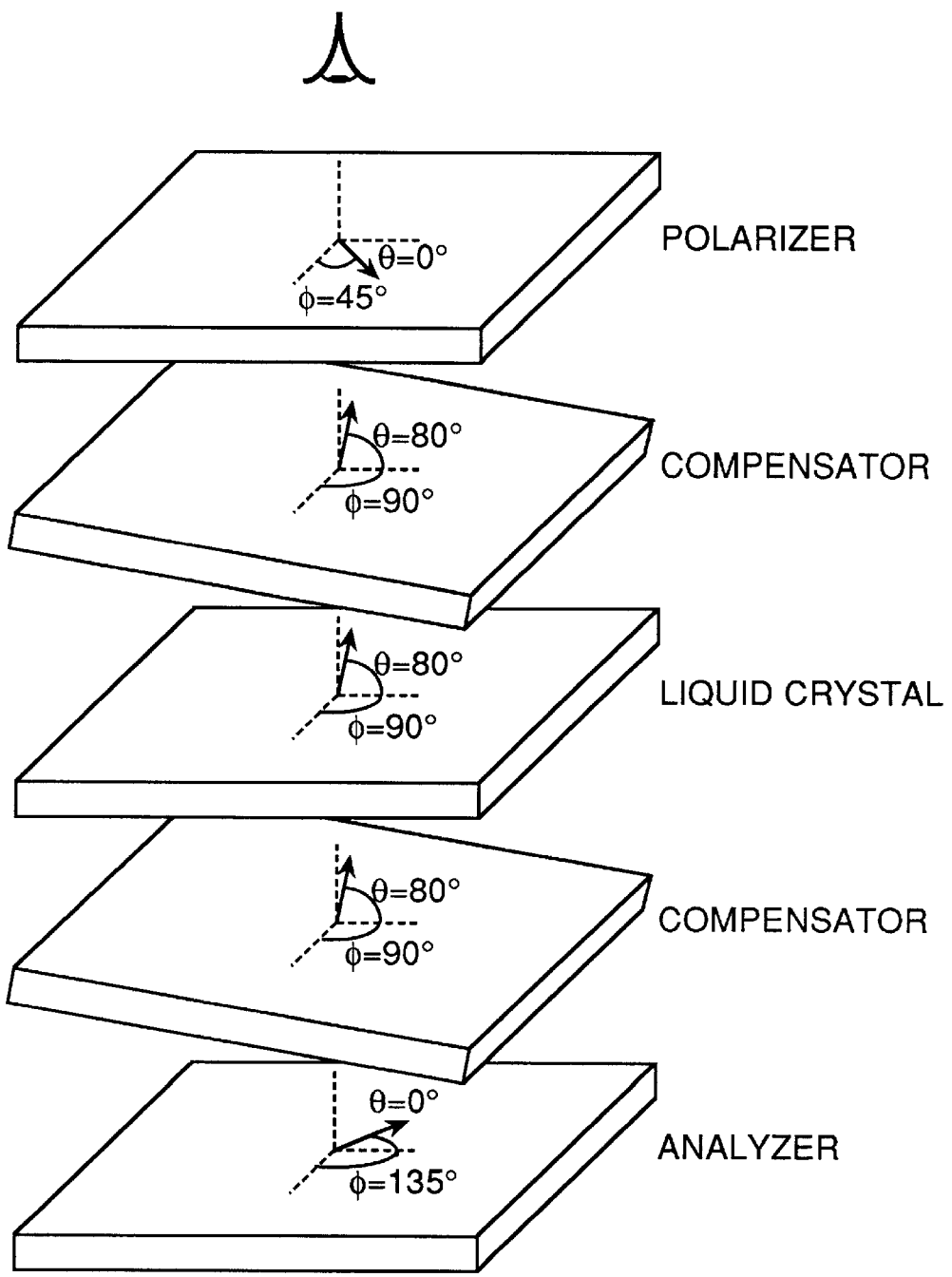

In one embodiment, for example, the surfaces of the liquid crystal layer, the compensator layers, the polarizer, and the analyzer are all oriented parallel to each other. This embodiment is depicted in the schematic, expanded view of FIG. 6, which illustrates a particular example using the directional convention of FIG. 5. In a second embodiment, depicted in FIG. 7, the liquid crystal layer is tilted with respect to the first and second compensator layers, the polarizer, and the analyzer layer such that the optical axis of the compensator layers is substantially parallel to the average direction of the optical axis within the central, nominally homeotropic region of the liquid crystal layer in its driven state. Another possible arrangement, as depicted in FIG. 8, would be to tilt the compensator layers with respect to the polarizer, analyzer, and liquid crystal layers to achieve the specified alignment. Tilting both the compensator axes and the polarizer and analyzer axes produces a synergistic improvement in the viewing angle compared to tilting either alone. An improvement in the contrast ratio in the lower quadrant is also possible, allowing the display to be inverted, thereby benefiting from the inherently better grayscale performance in the lower quadrant of a twisted nematic display.

The oblique axis compensators of this embodiment can be fabricated by growing a thin film, negative birefringence C-plate on a substrate having a tilted surface structure, such as a linear microprism array, obliquely deposited $SiO_2$, or a liquid crystal alignment surface that exhibits pretilt.

By using two identical compensator layers, one on each side of the liquid crystal cell, the contrast ratio can be improved at wide horizontal viewing angles. With appropriate orientation of the rub directions on either side of the cell relative to the viewing direction, both the left and right viewing angles can be improved to the same degree, producing a contrast ratio conoscope with a left-to-right symmetrical pattern about the vertical axis. The dual compensator layer design of this invention can also be employed to improve the vertical viewing angle as well.

The compensator layers utilized in this invention may be fabricated in a number of different ways. One approach which may be used is the thin film compensator described in Yeh, et al., "Compensator for Liquid Crystal Display . . . ", U.S. Pat. No. 5,196,953. Other techniques for fabricating these compensator layers are discussed in Hatoh, et al., Viewing Angle Magnification in a TN LCD with an Ultra-Super-Twisted Liquid Crystal Compensator, (ultra-super-twisted liquid crystal cell); Clerc, Vertically Aligned Liquid-Crystal Displays, SID 91 Digest, Pages 758–761 (Society for Information Display 1991) (vertically compressed isomer film); Yamamoto, et al., Full-Cone Wide-Viewing-Angle Multicolor CSH-LCD, SID 91 Digest, Pages 762–765 (Society for Information Display 1991) (biaxial stretched polymer film); Iieda, et al., Color Compensation Plate for Liquid-Crystal Display, Japan Kokai Tokkyo Koho No. JP 03028822 A2 (Feb. 7, 1991) (optically active biphenylene polyester film). Furthermore, the inventive concept is applicable to reflective as well as transmissive type liquid crystal displays.

Another type of liquid crystal display which may benefit from this invention is the supertwist nematic cell, which exhibits voltage response characteristics allowing it to be addressed by simple multiplexing, thereby avoiding the expense and manufacturing difficulty associated with active matrix addressing. The supertwist configuration is achieved by doping the nematic liquid crystal material with a chiral additive to give the cell from 90° to 270° of total twist. Supertwist nematic cells are typically used in the normally black configuration, often employing the compensation techniques described above for normally black displays. Such cells, however, can also be operated in the normally white mode and such normally white supertwist displays could also benefit from the addition of the multilayer compensator of this invention for field of view enhancement. Moreover, the compensation scheme of this invention is broadly applicable to any liquid crystal display device which employs a substantially homeotropically aligned black state as part of its operation.

The preferred embodiments of this invention have been illustrated and described above. Modifications and additional embodiments, however, will undoubtedly be apparent to those skilled in the art. Another possible embodiment, for example, would utilize the compensator layers as one or more of the substrates in the display structure. The invention is applicable as well to color displays, in which color filters are associated with the arrays of electrodes in the display. Furthermore, equivalent elements may be substituted for those illustrated and described herein, parts or connections might be reversed or otherwise interchanged, and certain features of the invention may be utilized independently of other features. In addition, details of the liquid crystal display, such as active matrix circuitry, are not presented because such details are well known in the art of liquid crystal displays. Consequently, the exemplary embodiments should be considered illustrative, rather than inclusive, while the appended claims are more indicative of the full scope of the invention.

The teaching of the following documents, which are referred to herein, is incorporated by reference:

Clerc, U.S. Pat. No. 4,701,028

Clerc, Vertically Aligned Liquid-Crystal Displays, SID 91 Digest, Pages 758–761 (Society for Information Display 1991);

Gooch, et al., The Optical Properties of Twisted Nematic Liquid Crystal Structures with Twist Angles≦90°, Journal of Physics D, Volume 8, Page 1575 (1975);

Hatoh, et al., Viewing Angle Magnification in a TN LCD with an Ultra-Super-Twisted Liquid Crystal Compensator, Iieda, et al., Color Compensation Plate for Liquid-Crystal Display, Japan Kokai Tokkyo Koho No. JP 03028822 A2 (Feb. 7, 1991);

Kahn, The Molecular Physics of Liquid-Crystal Devices, Physics Today, Page 68 (May 1982);

Yamamoto, et al., Full-Cone Wide-Viewing-Angle Multicolor CSH-LCD, SID 91 Digest, Pages 762–765 (Society for Information Display 1991); and Yeh, et al., "Compensator for Liquid Crystal Display . . . ", U.S. Pat. No. 5,196,953.

We claim:

1. A normally white liquid crystal display, comprising:

a polarizer layer having an absorbing axis;

an analyzer layer having an absorbing axis substantially perpendicular to the absorbing axis of the polarizer layer;

a liquid crystal layer disposed between the polarizer layer and the analyzer layer and having a director exhibiting an azimuthal twist through the layer;

a first electrode proximate to a first major surface of the liquid crystal layer;

a second electrode proximate to a second major surface of the liquid crystal layer, the first and second electrodes being adapted to apply a voltage across the liquid crystal layer when the electrodes are connected to a source of electrical potential; and a first negatively birefringent compensator layer, oriented with its optical axis substantially parallel to the average direction of the optical axis within a central, nominally homeotropic region of the liquid crystal layer in its driven state, disposed between the polarizer layer and the analyzer layer, the liquid crystal layer being tilted with respect to the first compensator layer, the polarizer layer, and the analyzer layer.

2. A normally white liquid crystal display, comprising:

a polarizer layer having an absorbing axis;

an analyzer layer having an absorbing axis substantially perpendicular to the absorbing axis of the polarizer layer;

a liquid crystal layer disposed between the polarizer layer and the analyzer layer and having a director exhibiting an azimuthal twist through the layer;

a first electrode proximate to a first major surface of the liquid crystal layer;

a second electrode proximate to a second major surface of the liquid crystal layer, the first and second electrodes being adapted to apply a voltage across the liquid crystal layer when the electrodes are connected to a source of electrical potential; and a first negatively birefringent compensator layer, oriented with its optical axis substantially parallel to the average direction of the optical axis within a central, nominally homeotropic region of the liquid crystal layer in its driven state, disposed between the polarizer layer and the analyzer layer, the first compensator layer being tilted with respect to the polarizer, analyzer, and liquid crystal layers.

3. A normally white liquid crystal display, comprising:

a polarizer layer having an absorbing axis;

an analyzer layer having an absorbing axis substantially perpendicular to the absorbing axis of the polarizer layer;

a liquid crystal layer disposed between the polarizer layer and the analyzer layer and having a director exhibiting an azimuthal twist through the layer;

a first electrode proximate to a first major surface of the liquid crystal layer;

a second electrode proximate to a second major surface of the liquid crystal layer, the first and second electrodes being adapted to apply a voltage across the liquid crystal layer when the electrodes are connected to a source of electrical potential; and a first negatively birefringent compensator layer disposed between the polarizer layer and the analyzer layer, oriented with its optical axis substantially parallel to the average direction of the optical axis within a central, nominally homeotropic region of the liquid crystal layer in its driven state, disposed between the polarizer layer and the analyzer layer;

a second negatively birefringent compensator layer, with a birefringence substantially the same as the birefringence of the first compensator layer and oriented with its optical axis substantially parallel to the optical axis of the first compensator layer, disposed between the analyzer layer and the liquid crystal layer, the liquid crystal layer being tilted with respect to the first and second compensator layers, the polarizer layer, and the analyzer layer.

4. A normally white liquid crystal display, comprising:

a polarizer layer having an absorbing axis;

an analyzer layer having an absorbing axis substantially perpendicular to the absorbing axis of the polarizer layer;

a liquid crystal layer disposed between the polarizer layer and the analyzer layer and having a director exhibiting an azimuthal twist through the layer;

a first electrode proximate to a first major surface of the liquid crystal layer;

a second electrode proximate to a second major surface of the liquid crystal layer, the first and second electrodes being adapted to apply a voltage across the liquid crystal layer when the electrodes are connected to a source of electrical potential; and a first negatively birefringent compensator layer disposed between the polarizer layer and the analyzer layer, oriented with its optical axis substantially parallel to the average direction of the optical axis within a central, nominally homeotropic region of the liquid crystal layer in its driven state, disposed between the polarizer layer and the analyzer layer;

a second negatively birefringent compensator layer, with a birefringence substantially the same as the birefringence of the first compensator layer and oriented with its optical axis substantially parallel to the optical axis of the first compensator layer, disposed between the analyzer layer and the liquid crystal layer, the first and second compensator layers being tilted with respect to the polarizer, analyzer, and liquid crystal layers.

5. A method of compensating for phase retardation in a normally white liquid crystal display of the type including a polarizer layer having an absorbing axis, an analyzer layer having an absorbing axis substantially erpendicular to the absorbing axis of the polarizer layer, a liquid crystal layer disposed between the polarizer layer and the analyzer layer and having a director exhibiting an azimuthal twist through the layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential, the method comprising the steps of:

placing a first negatively birefringent compensator layer between the polarizer layer and the analyzer layer;

orienting the first compensator layer with its optical axis substantially parallel to the average direction of the optical axis within a central, nominally homeotropic region of the liquid crystal layer in its driven state; and tilting the liquid crystal layer with respect to the first compensator layer, the polarizer layer, and the analyzer layer.

6. A method of compensating for phase retardation in a normally white liquid crystal display of the type including a polarizer layer having an absorbing axis, an analyzer layer having an absorbing axis substantially perpendicular to the absorbing axis of the polarizer layer, a liquid crystal layer disposed between the polarizer layer and the analyzer layer and having a director exhibiting an azimuthal twist through the layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential, the method comprising the steps of:

placing a first negatively birefringent compensator layer between the polarizer layer and the analyzer layer;

orienting the first compensator layer with its optical axis substantially parallel to the average direction of the optical axis within a central, nominally homeotropic region of the liquid crystal layer in its driven state; and tilting the first compensator layer with respect to the polarizer, analyzer, and liquid crystal layers.

7. A method of compensating for phase retardation in a normally white liquid crystal display of the type including a polarizer layer having an absorbing axis, an analyzer layer having an absorbing axis substantially perpendicular to the absorbing axis of the polarizer layer, a liquid crystal layer disposed between the polarizer layer and the analyzer layer and having a director exhibiting an azimuthal twist through the layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential, the method comprising the steps of:

placing a first negatively birefringent compensator layer between the polarizer layer and the liquid crystal layer;

orienting the first compensator layer with its optical axis substantially parallel to the average direction of the optical axis within a central, nominally homeotropic region of the liquid crystal layer in its driven state;

placing a second negatively birefringent compensator layer, with a birefringence substantially the same as the birefringence of the first compensator layer, between the analyzer layer and the liquid crystal layer;

orienting the second compensator layer with its optical axis substantially parallel to the optical axis of the first compensator layer; and tilting the liquid crystal layer with respect to the first and second compensator layers, the polarizer layer, and the analyzer layer.

8. A method of compensating for phase retardation in a normally white liquid crystal display of the type including a polarizer layer having an absorbing axis, an analyzer layer having an absorbing axis substantially perpendicular to the absorbing axis of the polarizer layer, a liquid crystal layer disposed between the polarizer layer and the analyzer layer and having a director exhibiting an azimuthal twist through the layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential, the method comprising the steps of:

placing a first negatively birefringent compensator layer between the polarizer layer and the liquid crystal layer;

orienting the first compensator layer with its optical axis substantially parallel to the average direction of the optical axis within a central, nominally homeotropic region of the liquid crystal layer in its driven state;

placing a second negatively birefringent compensator layer, with a birefringence substantially the same as the birefringence of the first compensator layer, between the analyzer layer and the liquid crystal layer;

orienting the second compensator layer with its optical axis substantially parallel to the optical axis of the first compensator layer; and tilting the first and second compensator layers with respect to the polarizer, analyzer, and liquid crystal layers.

* * * * *